United States Patent [19]

Lofgren et al.

[11] Patent Number: 5,281,922

[45] Date of Patent: Jan. 25, 1994

[54] METHOD FOR CAPACITANCE TEMPERATURE COMPENSATION AND MANUFACTURABILITY IN A DUAL PLATE CAPACITIVE PRESSURE TRANSMITTER

[75] Inventors: Lyle E. Lofgren, Minneapolis; John P. Schulte, Eden Prairie; Brian Seemann, Lakeville, all of Minn.

[73] Assignee: Rosemount Inc., Eden Prairie, Minn.

[21] Appl. No.: 32,637

[22] Filed: Mar. 17, 1993

Related U.S. Application Data

[62] Division of Ser. No. 775,311, Oct. 18, 1991, Pat. No. 5,237,285.

[51] Int. Cl.$^5$ ............................................. G01R 27/26
[52] U.S. Cl. .................................. 324/684; 324/661; 73/708
[58] Field of Search ................... 324/661, 679, 684; 73/708, 718, 724

[56] References Cited

U.S. PATENT DOCUMENTS

| | | | |
|---|---|---|---|
| 3,519,923 | 7/1970 | Martin | 324/61 |
| 4,145,619 | 3/1979 | Tseng | 307/118 |
| 4,370,890 | 2/1983 | Frick | 73/718 |
| 4,386,312 | 5/1983 | Briefer | 324/60 |
| 4,392,382 | 7/1983 | Myers | 73/708 |
| 4,398,194 | 8/1983 | Johnston | 340/870.37 |
| 4,403,297 | 9/1983 | Tivy | 364/579 |
| 4,763,063 | 8/1988 | Shkedi | 324/60 |
| 5,065,611 | 11/1991 | Angelosanto et al. | 73/4 |
| 5,111,698 | 5/1992 | Bonholzer et al. | 73/708 |
| 5,136,250 | 8/1992 | Abdelli | 324/661 |
| 5,163,326 | 11/1992 | Frick | 73/708 |
| 5,187,985 | 2/1993 | Nelson | 73/708 |

Primary Examiner—Kenneth A. Wieder
Assistant Examiner—Glenn W. Brown
Attorney, Agent, or Firm—Westman, Champlin & Kelly

[57] ABSTRACT

A two wire transmitter responsive to a pressure differential sensor includes a fixed module and a removable module. The fixed module is adapted for connection to an analog removable module having a compensation capacitance $M_A C_{DA}$ or a digital removable module having compensation capacitance $C_{DD}$. Capacitance compensation circuitry is included in the fixed module which includes a compensation capacitance $C_{DM}$ which is selected whereby $M_A C_{DA}$ equals $C_{DD}$ when the analog removable module and the digital removable module are calibrated. This provides a pressure transfer function which is more linearized and less susceptible to temperature variations.

3 Claims, 4 Drawing Sheets

METHOD FOR CAPACITANCE TEMPERATURE COMPENSATION AND MANUFACTURABILITY IN A DUAL PLATE CAPACITIVE PRESSURE TRANSMITTER

This is a divisional of application Ser. No. 07/775,311, filed Oct. 18, 1991, now U.S. Pat. No. 5,237,285.

BACKGROUND OF THE INVENTION

The present invention relates to transmitters used in industrial process control systems. In particular, the present invention relates to compensation for stray capacitance in transmitters which use a capacitance pressure differential sensor.

Two wire transmitters (as well as three wire and four wire transmitters) find widespread use in industrial process control systems. A two wire transmitter includes a pair of terminals which are connected in a current loop together with a power source and a load. The two wire transmitter is powered by the loop current flowing through the current loop. The two wire transmitter varies the magnitude of the loop current as a function of a parameter or condition which is sensed, for example sensed pressure.

Although a variety of operating ranges are possible, the most widely used two wire transmitter output varies from 4 to 20 milliamperes as a function of the sensed parameter. For example, typically 4 milliamperes represents a zero level and 20 milliamperes corresponds to a maximum output level.

Two wire transmitters have found widespread use in remote pressure sensing applications. A two wire transmitter uses a pressure differential sensor to sense pressure differential in an industrial environment. The two wire transmitter converts the sensed pressure differential into an electrical current level carried by the two wire current loop. Current flowing through the current loop can be sensed at a receiving unit and the pressure information conveyed to a system operator. One type of pressure differential sensor which is commonly used is a capacitive plate pressure sensor. U.S. Pat. No. 4,370,890, owned by the same assignee as the present invention, teaches one type of capacitance pressure differential sensor and is hereby incorporated by reference. The transfer function of the sensor is temperature dependent because the dielectric constant of oil in the sensor varies with temperature. Stray capacitance in the transmitter makes it difficult to account for this temperature dependence. It is known that in order to obtain accurate readings from a capacitance pressure differential sensor, stray capacitance must be canceled. Stray capacitance compensation is more difficult in two wire transmitters which use a removable module and a fixed module. In such a transmitter, the fixed module carries the sensor and the removable module carries transmitter circuitry. The capacitance values in a removable module may not match, and the effects of stray capacitance will need to be compensated after the removable modules are installed. This reduces the compatibility between different removable modules. There are two types of removable modules. One type (a "digital" model) uses digital circuitry to linearize the sensor output while the other type (an "analog" model) uses analog circuitry. The two types use two different methods to linearize the signal from the pressure differential sensor. This results in two different temperature coefficients for the transfer function of the sensors, which limits the compatibility between the two types of removable modules.

There is a continuing need for improved stray capacitance compensation which improves compatibility between different types of removable modules.

SUMMARY OF THE INVENTION

The present invention relates to circuitry in a process control transmitter which compensates for stray capacitance associated with a capacitance pressure differential sensor. The temperature coefficient of the transmitter is improved because the temperature coefficient is no longer dependent on the stray capacitance of the sensor.

The present invention provides improved compatibility between different types of fixed and removable modules by providing a transfer function for the sensor which is relatively temperature independent as the temperature of the sensor changes, regardless of what type (digital or analog) removable module is used in the transmitter.

A remote process control transmitter includes a fixed module and a removable module. The fixed module includes a capacitive pressure transducer and means for compensating for stray capacitance. The removable module plugs into the fixed module and carries circuitry for coupling to a two wire current loop. Current through the current loop is adjusted in response to pressure sensed by the capacitance pressure differential sensor.

The means for compensating for stray capacitance is placed directly in the fixed module. Rather than completely linearizing the signal, the means for compensating for stray capacitance partially linearizes the signal from the capacitance pressure differential sensor. The remaining linearization (which consists of compensating for any remaining, uncompensated stray capacitance) is done in the removable module. The temperature coefficient of the system is directly related to uncompensated stray capacitance. The present invention reduces the sensitivity of the pressure transfer function to changes in temperature by reducing the size of uncompensated stray capacitance.

DETAILED DESCRIPTION OF THE PREFERRED EMBODIMENTS

Figure 1:
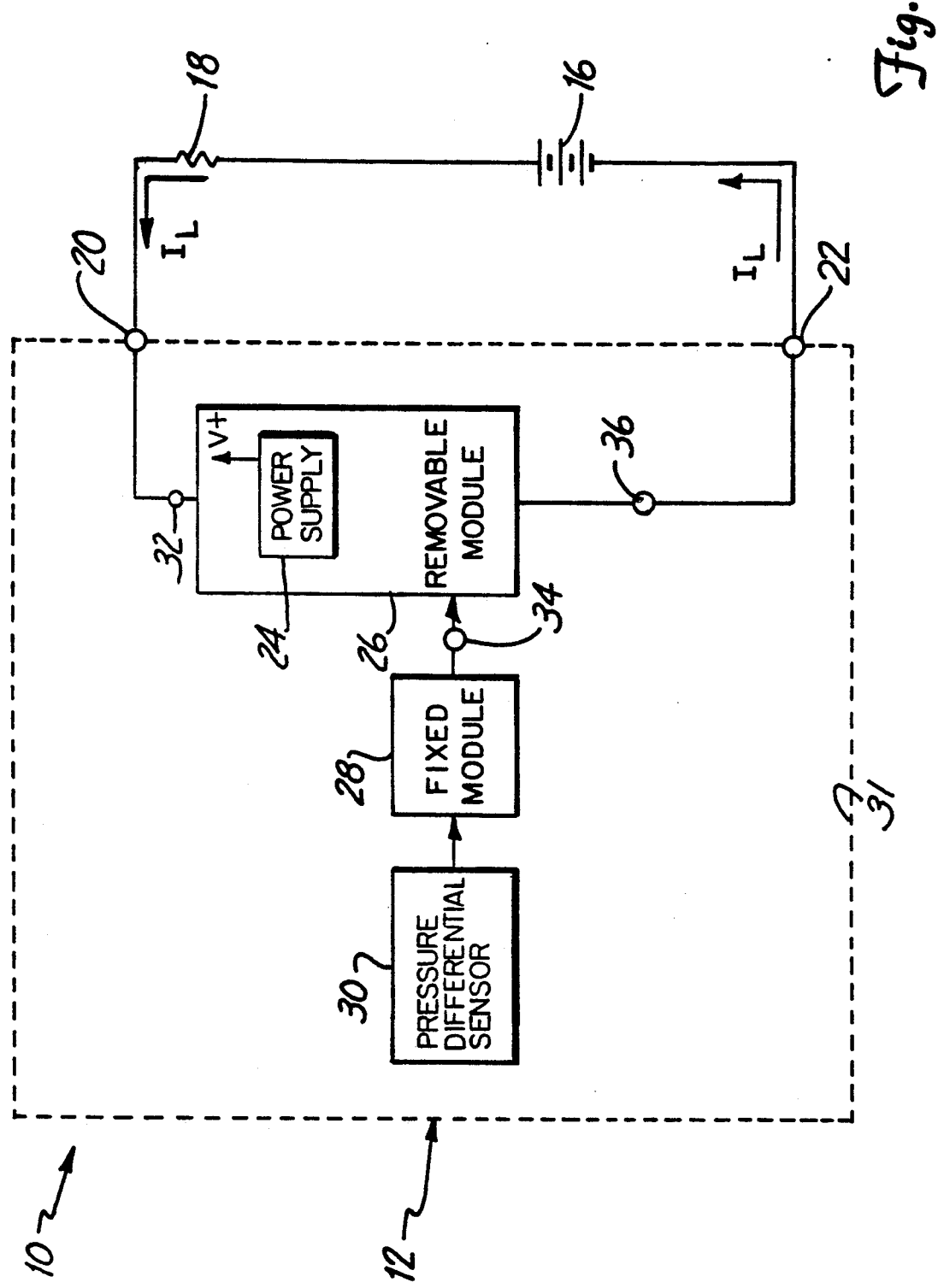
FIG. 1 is a block diagram of a two wire current loop communication system for transmitting pressure information which is made in accordance with the present invention.

FIG. 1 shows a block diagram of a two wire current loop communication system 10 which includes a remote transmitter 12 made in accordance with the present invention. Two wire loop communication system 10 includes a power source 16 and a load 18. Transmitter 12 connects to the current loop at terminals 20 and 22.

Transmitter 12 includes removable module 26, fixed module 28, and pressure differential sensor 30. Within removable module 26 is a power supply 24 which provides a voltage V+ for powering circuitry in removable module 26. Typically, pressure differential sensor 30 is physically part of fixed module 28. Removable module 26, fixed module 28 and pressure differential sensor 30 are carried in a transmitter housing 31.

Power source 16 causes a current $I_L$ to flow in two wire communication system 10. Load 18 develops a voltage across its terminals due to current $I_L$. Current $I_L$ is received by transmitter 12 and is used by power supply 24 to develop the voltage V+. Power supply 24 supplies power to removable module 26, fixed module 28, and pressure differential sensor 30. Pressure differential sensor 30 is a capacitance plate pressure sensor unit and is used to detect pressure in an industrial process. Pressure differential sensor 30 converts a measured pressure into a capacitance value representing a ratio of the active capacitors in pressure differential sensor 30. Fixed module 28 is connected to pressure differential sensor 30. Fixed module 28 contains circuitry associated with the operation of pressure differential sensor 30.

Removable module 26 plugs into transmitter 12 at connectors 32, 34, and 36. Removable module 26 is connected to fixed module 28. Removable module 26 converts the capacitance of pressure differential sensor 30 into a current level $I_L$ which flows through two wire communication system 10. Additionally, removable module 26 compensates for any remaining stray capacitance. Removable module 26 controls current $I_L$ between a minimum level and a maximum level, for example, 4 mA and 20 mA. Removable module 26 can be adjusted so that a minimum pressure signal from pressure differential sensor 30 corresponds to a 4 mA current and a maximum pressure signal corresponds to a 20 mA current.

Typically remote transmitter 12 is separated into two halves. Pressure differential sensor 30 and fixed module 28 reside in one half and removable module 26 and other circuitry reside in the other. This is driven by two competing design constraints. It is desirable to reduce the operating temperature of electronics in remote transmitter 12. Since pressure differential sensor 30 typically operates at high temperatures, removable module 26 is physically separated from sensor 30 and fixed module 28. At the same time, it is desirable to place some electrical components close to pressure differential sensor 30. Therefore, fixed module 28 is placed proximate to pressure differential sensor 30. Typically, pressure differential sensor 30 is subject to physical and thermal shocks. To increase the durability of the unit, pressure differential sensor 30 and fixed module 28 are mounted to housing 31 and cannot be removed.

Fixed module 28 and removable module 26 of transmitter 12 shown in FIG. 1 include circuitry to adjust for stray capacitance in accordance with the present invention. This circuitry is described below in more detail.

Figure 2:
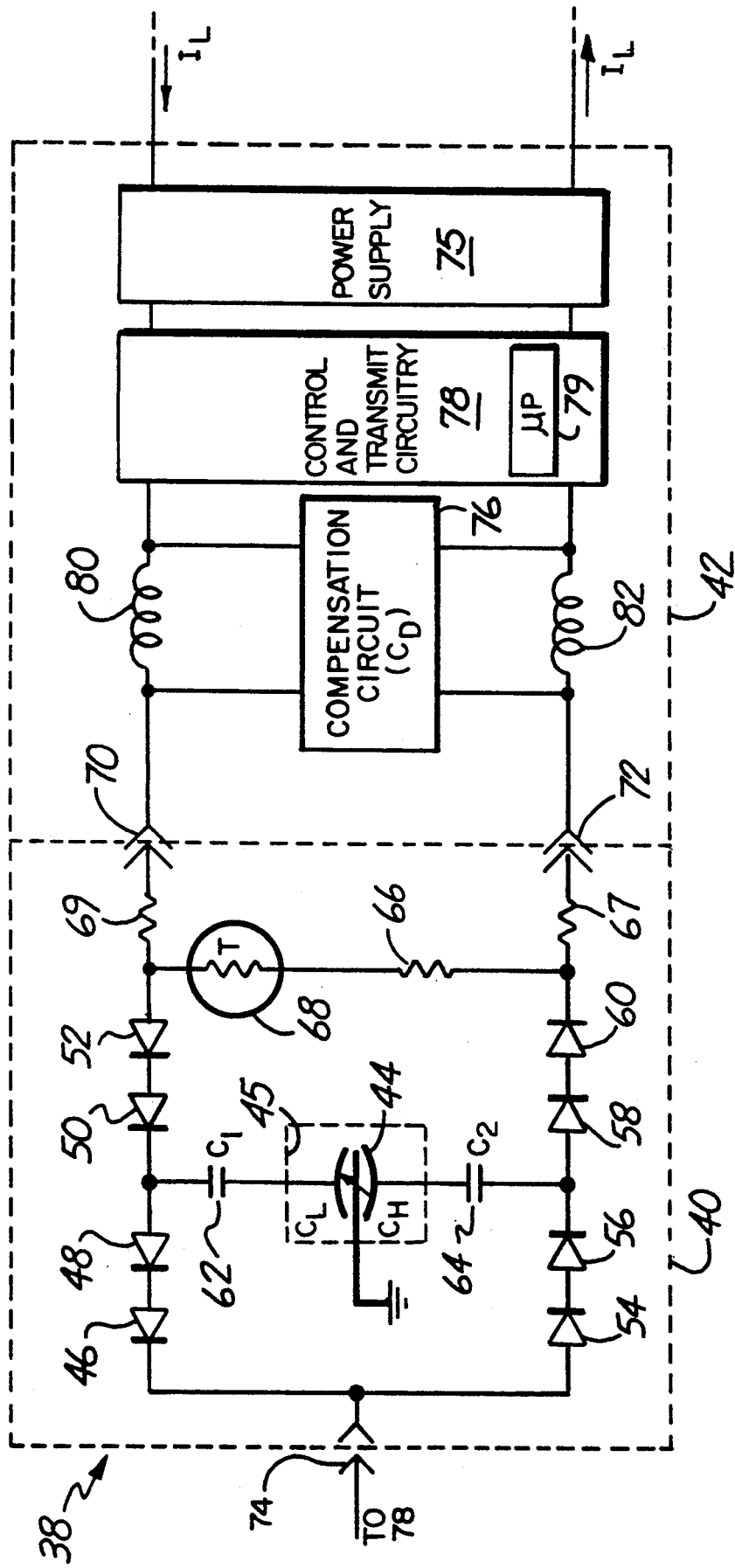
FIG. 2 is a simplified electrical schematic diagram of prior art transmitter circuitry in a two wire current loop communication system.

For comparison purposes, FIG. 2 shows an electrical schematic diagram of prior art two wire transmitter 38. Prior art transmitter 38 includes a fixed module 40 and a removable module 42. Fixed module 40 includes a capacitance pressure differential sensor 44 which is used to sense pressure in an industrial process. Capacitance pressure differential sensor 44 is mounted in a metal housing 45. Fixed module 40 includes diodes 46, 48, 50, 52, 54, 56, 58, and 60. Capacitors 62 and 64 couple signals from capacitance pressure differential sensor 44 to diodes 46-60. Fixed module 40 also includes resistors 66, 67, and 69, and a thermistor 68. Fixed module 40 couples to removable module 42 through connectors 70, 72, and 74. An AC signal is applied to sensor 44 through connectors 70, 72, and 74. Diodes 46-60 act as a full wave rectifier. An output signal comprising a DC current is presented at connector 74.

Removable module 42 includes power supply 75, compensation circuitry 76, and control and transmit circuitry 78. Control and transmit circuitry 78 can include a microprocessor 79. Control and transmit circuitry 78 is coupled to capacitance pressure differential sensor 44 through inductors 80 and 82. Control and transmit circuitry 78 is connected to the two wire current loop which carries current $I_L$. compensation circuitry 76 compensates for stray capacitance which causes errors in pressure measurements.

To appreciate the nature of the present invention, it is necessary to understand the relationship between a measured pressure and changes in capacitance of capacitance pressure differential sensor 44. Capacitance pressure differential sensor 44 provides two capacitances which relate to pressure, $C_H$ and $C_L$. The capacitance transfer functions of capacitance pressure differential sensor 44 are:

$$C_H(P) = \frac{C_O}{1 + KP} + C_S \qquad \text{Equation 1}$$

$$C_L(P) = \frac{C_O}{1 - KP} + C_S \qquad \text{Equation 2}$$

where:
$C_O$ = Rest capacitance of pressure sensitive capacitor (i.e. the value of the capacitance pressure differential sensor with no pressure applied). This term changes with temperature.
$C_S$ = stray capacitance independent of pressure.
$C_O + C_S$ = sensor capacitance with no pressure applied.
K = a pressure-normalizing spring constant (spring constant of the center diaphragm between $C_L$ and $C_H$ of the sensor).
P = applied pressure.

The transfer function of fixed module 40 as measured by removable module 42 is as follows:

$$R(P) = \frac{C_L - C_H}{C_L + C_H} \qquad \text{Equation 3}$$
$$= \frac{\frac{C_O}{1-KP} + C_S - \frac{C_O}{1+KP} - C_S}{\frac{C_O}{1-KP} + C_S + \frac{C_O}{1+KP} + C_S}$$
$$= \frac{C_O 2KP}{2C_O + 2C_S(1 - K^2 P^2)}$$

(This assumes that there is symmetry between $C_H$ and $C_L$. This means that the value and temperature coefficients of $C_O$, $C_S$ and K for the $C_H$ side are substantially the same as the values and temperature coefficients of $C_O$, $C_S$ and K for the $C_L$ side of sensor 44.)

Equation 3 shows that there is a second order pressure term which remains in the denominator. This second order pressure term is due to stray capacitance $C_S$. Prior art transmitter circuitry 38 (shown in FIG. 2) attempts to compensate for this stray capacitance using two alternative methods. In one ("digital") method, software in microprocessor 79 partially linearizes the transfer curve in combination with a linearizing capacitance $C_{DD}$). In another ("analog") method, a linearizing capacitance $M_AC_{DA}$ is introduced by compensation circuitry 76. ($M_A$ ranges from 0 to 1 and is based upon a potentiometer.)

With the introduction of $M_AC_{DA}$, the transfer function becomes:

$$R_A(P) = \frac{C_L - C_H}{C_L + C_H - 2M_AC_{DA}} = \frac{C_O 2KP}{2C_O + 2(C_S - M_AC_{DA})(1 - K^2P^2)} \quad \text{Equation 6}$$

Ideally, $M_AC_{DA} = C_S$ and the second term in the denominator is canceled. If this is true, the $C_O$ terms cancel, and the $R_A(P)$ will not be temperature dependent. $C_O$ is dependent on the dielectric constant of oil used to fill the sensor 44. The dielectric constant of the oil is temperature dependent. Since $C_S$ varies between individual fixed modules, the value of $M_AC_{DA} = C_S$ is different for each combination of analog removable module 42 and fixed module 40. The amount of temperature effect due to the temperature coefficient of the dielectric constant of the oil is dependent on the magnitude Of $C_{S-M_AC_{DA}}$ in Equation 4.

In a "digital" model of removable module 42, a compensation capacitor, $C_{DD}$, is set to a fixed, nominal value. In this type of a module, the transfer function can be linearized at room temperature using software which is run by microprocessor 79 carried in transmit circuitry 78. The transfer function (before software linearization) in the digital model is as follows:

$$R_D(P) = \frac{C_L - C_H}{C_L + C_H - 2C_{DD}} = \frac{C_O 2KP}{2C_O + 2(C_S - C_{DD})(1 - K^2P^2)} \quad \text{Equation 5}$$

In general, ($C_S - C_{DD}$) in Equation 5 will not be the same as ($C_S - C_{DA}$) in Equation 4. Thus the effect of oil dielectric temperature coefficient on $C_O$ will have a different effect on the transfer functions of Equations 4 and 5. The difference between analog and digital type of removable module 42 can be seen in the following two equations which illustrate how the transfer function of the pressure transducer is affected by temperature.

$$R_A(P, T) = \frac{C_O(T)2K(T)P}{2C_O(T) + 2(C_S(T) - M_AC_{DA}(T))(1 - K(T)^2P^2)} \quad \text{Equation 6}$$

$$R_D(P,T) = \frac{C_O(T)2K(T)P}{2C_O(T) + 2(C_S(T) - C_{DD}(T))(1 - K(T)^2P^2)} \quad \text{Equation 7}$$

(Although some of the other terms are also temperature dependent, $C_O(T)$ is the dominant temperature dependent term in Equations 6 and 7.) Using the potentiometer control, the $M_AC_{DA}$ term of Equation 6 can substantially cancel the $C_S$ term at room temperature. This provides a very linear pressure curve at room temperature and permits cancellation of the $C_O(T)$ term. The effect of the oil dielectric temperature coefficient on the transmitter temperature coefficient will be minimal.

On the other hand, in Equation 7, $C_{DD}(T)$ is a constant and does not perfectly cancel the $C_S(T)$ term. Since $C_{DD}(T)$ is fixed, it cannot compensate for all values of $C_S(T)$ which can be encountered through all ranges and process variations in differential pressure sensor 44 or between different replaceable modules 42.

The oil dielectric temperature coefficient will cause a transmitter temperature coefficient which is related to the mismatch of $C_S$ and $C_{DD}$.

The present invention is a modification of fixed module 40 which provides a higher degree of interchangeability between those removable modules which yield the pressure transfer function of Equations 4 and 6 and those having the transfer function of Equation 5 and 7. This improves compatibility between pressure differential sensor 44 and present and future electronic removable modules 42 and will improve temperature performance of transmitters built using different types of pressure differential sensor 44. The improvement is by a factor of about two. A fixed capacitance compensation circuit is included in fixed module 40. The value of this additional compensation is chosen so that when the analog removable module is calibrated, $M_AC_{DA}$ will substantially equal $C_{DD}$. This is accomplished by including a compensation capacitor, $C_{DM}$, in the fixed module.

Figure 3:
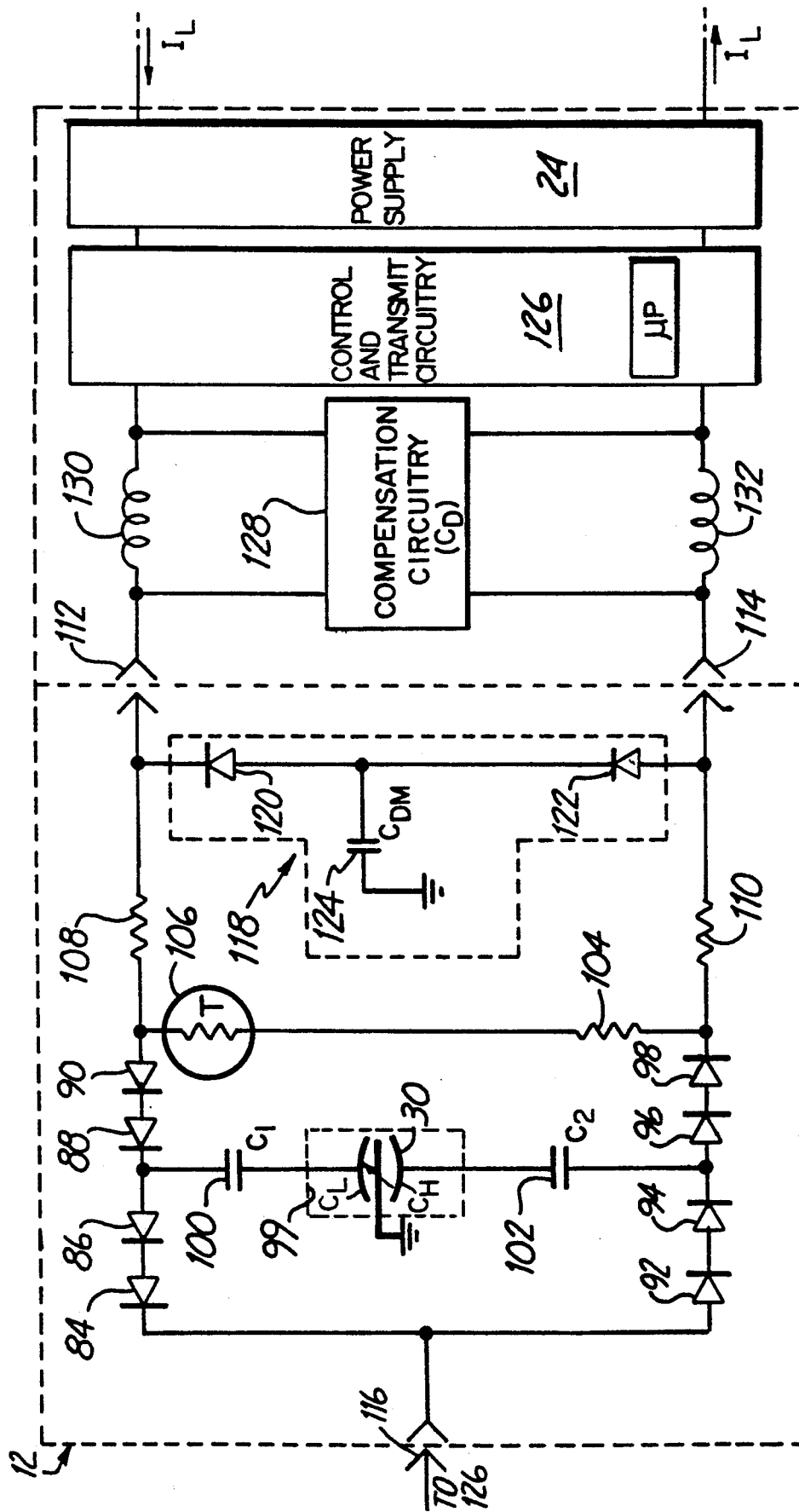
FIG. 3 is a simplified electrical schematic diagram of a two wire transmitter made in accordance with the present invention.

FIG. 3 is a simplified electrical schematic diagram of a two wire transmitter 12 made in accordance with the present invention. Two wire transmitter 12 includes a removable module 26 and a fixed module 28. Fixed module 28 includes capacitance pressure differential sensor 30, and diodes 84, 86, 88, 90, 92, 94, 96, and 98. Sensor 30 is mounted in a metal housing differential sensor 30 to diodes 84–98. Fixed module 28 includes a resistor 104 and a thermistor 106. Fixed module 28 also includes series resistors 108 and 110. Fixed module 28 connects to removable module 26 through connectors 112, 114, and 116.

In accordance with the present invention, fixed module 28 also includes a capacitance compensation circuit 118. Capacitance compensation circuit 118 includes diodes 120 and 122 and a compensation capacitor 124 which has capacitance $C_{DM}$.

Removable module 26 includes control and transmit circuitry 126, compensation circuitry 128, and inductors 130 and 132. Control and transmit circuitry 126 can include a microprocessor 127. Control and transmit circuitry 126 is coupled to fixed module 28 through inductors 130 and 132. Control and transmit circuitry 126 controls current $I_L$ through the current loop in response to the pressure sensed by capacitance pressure differential sensor 30.

Fixed module 28 includes capacitance compensation circuitry 118 which is used to partially cancel stray capacitance in pressure measurements. In the present invention, a linearizing capacitance $C_{DM}$ (capacitor 124) is provided in fixed module 28.

By locating module compensation circuitry 118 in fixed module 28, compensation circuitry 128 or software algorithms located within microprocessor 127 of removable module 26 only need compensate for the residual stray capacitance. This means that different types of modules can be used for removable module 26 which all produce linearized, temperature compensated transmitters.

Maintaining backward compatibility with older modules is important because it allows old fixed modules 40 to be mated with new removable modules 26 while achieving equal or better performance systems to be partially upgraded as new products are developed. (Backward compatibility refers to maintaining compatibility between new products and old products.) In order to ensure backward compatibility of newer fixed module 28 with those types of removable modules 42 that use compensation circuitry 76, the stray capacitance $C_S$ of fixed module 28 should not be completely canceled by $C_{DM}$ (the novel capacitance). This is necessary because $M_A$ of Equation 8 cannot be calibrated to exactly zero. Referring to Equation 6 above, the transfer function for fixed module 28 as measured by removable module 26 in the "analog" system is:

$$R_A''(P,T) = \frac{C_O(T)2K(T)P}{2C_O(T) + 2(C_S(T) - C_{DM}(T) - M_A C_{DA}(T))(1 - K(T)^2 P^2)}$$

$$\approx K_A(T)P$$

$$\text{if } (C_S(T) - C_{DM}(T) - M_A C_{DA}(T)) \approx 0$$

Equation 8 where:
$C_{DM}$ = compensation capacitance in the module 28,
$C_{DA}$ = compensation capacitance in removable module 26.
$M_A$ = ranges between a number close to 0 and 1 based upon a potentiometer in compensation circuitry 128.

In the case of a removable "digital" module 26, prior to software based capacitance compensation, the transfer function including the novel compensation capacitance, $C_{DM}$, is:

$$R_D''(P,T) = \frac{C_O(T)2K(T)P}{2C_O(T) + 2(C_S(T) - C_{DM}(T) - C_{DD}(T))(1 - K(T)^2 P^2)}$$

$$\approx K_D(T)P$$

$$\text{if } (C_S(T) - C_{DM}(T) - C_{DD}(T)) \approx 0$$

Equation 9

$C_{DM}$ is chosen so that, after adjustment, $M_A C_{DA}$ in Equation 8 substantially equals $C_{DD}$ in Equation 9. Therefore, both $K_A(T)$ and $K_D(T)$ exhibit similar temperature dependencies. Temperature compensation of the fixed module (components 104, 106, 108 and 110 of FIG. 3) can then be performed to eliminate the temperature dependence of $K_A$ and $K_D$, resulting in a signal dependent on pressure but substantially independent of temperature. The temperature coefficient is substantially the same regardless of whether a digital or an analog removable module is used.

There are two types of units used as module 26. In an "analog" type, compensation circuit 128 cancels out any residual stray capacitance. In a "digital" type, a discrete capacitor $C_{DD}$, in compensation circuitry 128 nominally cancels any residual stray capacitance. Software run in microprocessor 127 further linearizes the transfer function. In both cases the stray capacitance is canceled by the combined effect of capacitor 124 and compensation circuitry 128. As the effect of temperature variation is directly related to the size of the uncompensated stray capacitance, changes in the residual stray capacitance due to temperature will be relatively small. Changes in the total stray capacitance due to temperature will be closely tracked by changes in capacitor 124, which is a physical capacitor.

The value of $C_{DM}$ is chosen such that when fixed module 28 is used with an "analog" removable module 26 and correctly calibrated, $M_A C_{DA}$ in Equation 8 will be substantially the same as $C_{DD}$ in Equation 9. This causes Equation 8 to be the substantially the same as Equation 9 so that the two circuits will exhibit similar temperature variations as the dielectric constant of the oil in sensor 30 changes with temperature. In addition to exhibiting similar temperature variations, the present invention corrects for any change that alters $C_H$ and $C_L$ by the same proportion.

In accordance with the present invention, $C_{DM}$ can be made to more effectively track the effects of temperature in the stray capacitance. This can be achieved by constructing $C_{DM}$ of the same material as sensor 30 and locating $C_{DM}$ near sensor 30.

Figure 4:
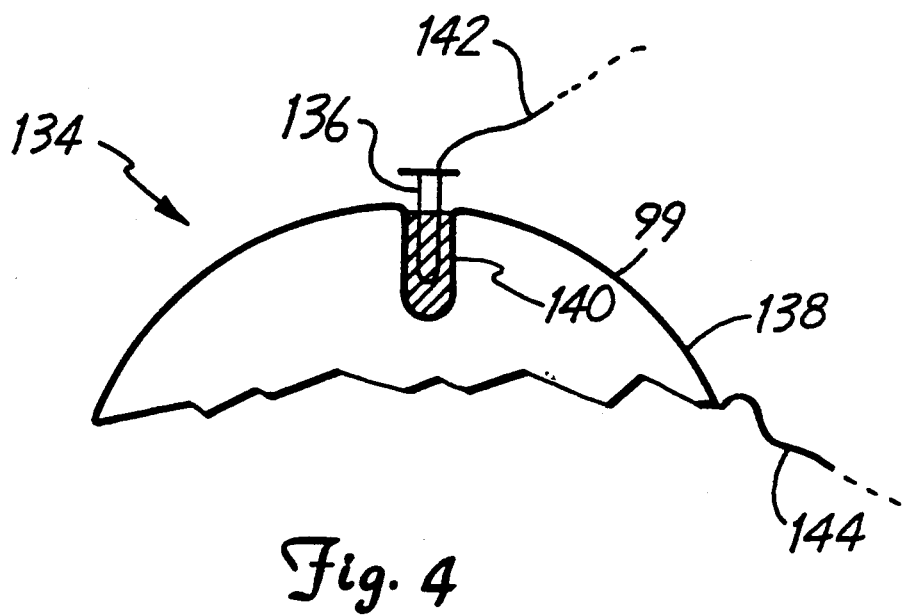
FIG. 4 is a cross sectional view of a capacitor for use in the present invention.

FIG. 4 shows an example of a capacitor 134 which may be used for capacitor 124 in compensation circuit 118 of FIG. 3 to create the $C_{DM}(T)$ term. Capacitor 134 includes a plunger 136 which extends into metal housing 99. Plunger 136 extends into a hole 140 which is filled with the same type of insulator used to construct insulating structures in housing 99. Wires 142 and 144 make connection to capacitor 134. The capacitance of capacitor 134 can be varied by placing plunger 136 at different depths in hole 140. Using this technique, the desired capacitance $C_{DM}$ can be selected. In the embodiment of FIG. 4, $C_{DM}(T)$ will track changes in stray capacitance that are temperature dependent.

In the present invention, a transmitter housing is provided with electronics in a fixed module which include appropriately matched compensation capacitance and associated diodes. A removable module is included so that replacement electronics can be installed in the field which has a fine adjustment for canceling the residual stray capacitance associated with unit to unit variations. Alternatively, the removable module includes a fixed capacitance for nominally canceling the residual stray capacitance. A digital circuit may also be included which implements a linearization algorithm. In the present invention the residual stray capacitance in the fixed module is set such that it is nominally cancelled by a standard fixed capacitance on one type of removable module. Removable modules which have variable compensation capacitances are able to substantially cancel out the residual stray capacitance in fixed modules. This helps ensure backwards compatibility with older models of the removable module.

Although the present invention has been described with reference to preferred embodiments, workers skilled in the art will recognize that changes may be made in form and detail without departing from the spirit and scope of the invention. For example, various types of capacitance compensation networks and capacitor constructions can be used.

What is claimed is:
1. A method of varying a capacitance to compensate for stray capacitance in a transmitter in a two wire current loop having a fixed module which includes a capacitance pressure differential sensor for changing a capacitance $C_L$ and a capacitance $C_H$ in response to pressure, the fixed module adapted for connection to an analog removable module having an adjustable compensating capacitance $M_A C_{DA}$ and resulting in a pressure transfer function:

$$R_A \text{ (Pressure)} = \frac{C_L - C_H}{C_L + C_H - 2M_A C_{DA}}$$

and adapted for connection to a digital removable module having a compensating capacitance $C_{DD}$ and resulting in a transfer function:

$$R_D \text{ (Pressure)} = \frac{C_L - C_H}{C_L + C_H - 2C_{DD}},$$

the method comprising:
- providing a capacitance compensation circuit in the fixed module;
- creating a compensation capacitance $C_{DM}$ for the capacitance compensation circuit by placing an electrode in a cavity, the cavity filled with a dielectric material; and
- selecting $C_{DM}$ by changing the position of the electrode in the cavity so that when $M_A C_{DA}$ equals $C_{DD}$ a pressure transfer function for the fixed module in combination with the analog removable module is substantially the same as a pressure transfer function for the fixed module in combination with the digital removable module.

2. The method of claim 1 including varying dimensions of the electrode to obtain the desired capacitance value for $C_{DM}$.

3. The method of claim 1 wherein the cavity is formed in a housing of the transmitter.

* * * * *

UNITED STATES PATENT AND TRADEMARK OFFICE
CERTIFICATE OF CORRECTION

PATENT NO. : 5,281,922
DATED : January 25, 1994
INVENTOR(S) : Lyle E. Lofgren, John P. Schulte and Brian Seemann It is certified that error appears in the above-indentified patent and that said Letters Patent is hereby corrected as shown below:

Col. 4, line 54, at the end of the line, please change "$K^6 \ P^2$" to --$K^2 \ P^2$--;

Col. 5, please change "Equation 6" to --Equation 4--;

Col. 5, line 23, please change $C_S - _{MA}C_{DA}$" and insert --$C_S - M_A C_{DA}$;

Col. 6, line 27, after "housing" insert --99. Capacitors 100 and 102 couple capacitance pressure--; and Col. 8, line 8, please change "Of" to --of--.

Signed and Sealed this

Nineteenth Day of December, 1995

Attest:

BRUCE LEHMAN

Attesting Officer

Commissioner of Patents and Trademarks